Patented Aug. 18, 1931

1,819,613

UNITED STATES PATENT OFFICE

CARL L. MASTERS, OF NITRO, WEST VIRGINIA, ASSIGNOR TO THE ELKO CHEMICAL COMPANY, OF NITRO, WEST VIRGINIA, A CORPORATION OF WEST VIRGINIA

MANUFACTURE OF ORGANIC MONOCARBOXYLIC ACID CHLORIDES

No Drawing. Application filed May 7, 1928. Serial No. 275,975.

The present invention relates to the preparation of organic acid chlorides. More particularly, the invention relates to the manufacture of organic acid chlorides by treating the acid anhydride with thionyl chloride.

An example of the preferred manner in which the invention may be carried into effect is shown hereinafter, wherein an organic acid chloride, for example acetyl chloride, is prepared from acetic anhydride and thionyl chloride according to the following equation:

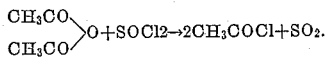

Approximately one molecular proportion (102 parts) of acetic anhydride was placed in a vessel capable of being closed and equipped with means for the introduction of the thionyl chloride and the discharge of the sulfur dioxide gas generated by the reaction. Approximately one molecular proportion (119 parts) of thionyl chloride was added to the acetic anhydride which was maintained at a temperature varying between room temperature and the boiling point of acetyl chloride. The preferred temperature for the addition of the thionyl chloride, however, is approximately 20 to 25° C. It is advantageous to cool the effluent sulfur dioxide gas by passing it through a cooling medium, for example, a condenser cooled with tap water, so as to condense the greater portion of the vapors of the acetyl chloride that may be carried therewith. The effluent sulfur dioxide gas which may carry some uncondensed acetyl chloride therewith is finally passed through cold acetic anhydride or other absorbing means to absorb any uncondensed acetyl chloride. This absorbed acetyl chloride together with the acetic anhydride employed as the absorbing medium is preferably added to the next run of acetic anhydride to be reacted with thionyl chloride. It may, however, be added to the main reaction product to be distilled therewith.

When the reaction with thionyl chloride is completed, the acetyl chloride formed thereby is separated by distillation.

In the carrying out of the invention it is not necessary that the thionyl chloride be added to the anhydride as hereinbefore stated. The anhydride may be added to the thionyl chloride, or the anhydride and the thionyl chloride may be added simultaneously to the reaction vessel at substantially the temperatures as stated and the acetyl chloride isolated therefrom by distillation.

The invention has been applied in a similar manner to the production of other organic acid chlorides. For example, benzoyl chloride has been prepared from benzoic acid anhydride and thionyl chloride in a manner similar to that hereinbefore described.

What is claimed is:

1. The process of manufacturing an organic monocarboxylic acid chloride comprising the treating of an organic monocarboxylic acid anhydride with thionyl chloride.

2. The process of manufacturing an organic monocarboxylic acid chloride of the fatty acid series, comprising the treating of a monocarboxylic fatty acid anhydride with thionyl chloride.

3. The process of manufacturing acetyl chloride, comprising the reaction between acetic acid anhydride and thionyl chloride.

4. The process of manufacturing acetyl chloride comprising the reacting of thionyl chloride on acetic acid anhydride at a temperature varying between room temperature and the boiling point of acetyl chloride.

5. The process of manufacturing acetyl chloride, comprising the reacting of thionyl chloride on acetic acid anhydride at a temperature of approximately 20 to 25° C.

6. The process of manufacturing acetyl chloride comprising the reaction between substantially equi-molecular proportions of acetic acid anhydride and thionyl chloride at a temperature of approximately 20 to 25° C.

7. The process of manufacturing an organic monocarboxylic acid chloride comprising the reaction between substantially equimolecular proportions of an organic monocarboxylic acid anhydride and thionyl chloride.

8. The process of manufacturing an organic monocarboxylic acid chloride comprising the reaction between substantially equimolecular proportions of an organic monocarboxylic acid anhydride and thionyl chloride at a temperature of approximately between 20 and 25° C.

In testimony whereof I hereunto affix my signature.

CARL L. MASTERS.